(12) United States Patent
Zhang (10) Patent No.: US 10,835,822 B2
(45) Date of Patent: Nov. 17, 2020

(54) APPLICATION CONTROL METHOD AND TERMINAL DEVICE

(71) Applicant: TENCENT TECHNOLOGY (SHENZHEN) COMPANY LIMITED, Guangdong (CN)

(72) Inventor: Delin Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 427 days.

(21) Appl. No.: 15/380,600

(22) Filed: Dec. 15, 2016

(65) Prior Publication Data

US 2017/0095740 A1  Apr. 6, 2017

Related U.S. Application Data

(63) Continuation of application No. PCT/CN2015/081789, filed on Jun. 18, 2015.

(30) Foreign Application Priority Data

Jun. 18, 2014 (CN) .......................... 2014 1 0273134

(51) Int. Cl.
*A63F 13/67* (2014.01)
*G06F 3/16* (2006.01)
(Continued)

(52) U.S. Cl.
CPC ............ *A63F 13/67* (2014.09); *A63F 13/215* (2014.09); *A63F 13/537* (2014.09); *G06F 3/04817* (2013.01); *G06F 3/167* (2013.01)

(58) Field of Classification Search
CPC ....................................................... A63F 13/67
See application file for complete search history.

(56) References Cited

U.S. PATENT DOCUMENTS

| 6,529,875 B1 * | 3/2003 | Nakajima ............... A63F 13/02 704/275 |
| 6,544,123 B1 * | 4/2003 | Tanaka .................... A63F 13/10 463/36 |

(Continued)

FOREIGN PATENT DOCUMENTS

| CN | 1979407 A | 6/2007 |
| CN | 101300595 A | 11/2008 |

(Continued)

OTHER PUBLICATIONS

Supplementary European Search Report in European application No. 15810289.7, dated Nov. 10, 2017.

(Continued)

*Primary Examiner* — Omkar A Deodhar
(74) *Attorney, Agent, or Firm* — Anova Law Group, PLLC (57) ABSTRACT

Embodiments of the present invention relate to the field of Internet technologies, and disclose an application control method and a terminal device. The method includes: determining whether a currently running application meets a condition for casting a skill, and if the currently running application meets the condition for casting a skill, outputting a skill name corresponding to at least one castable skill; detecting a target skill name input by a user in voice mode; recognizing the target skill name and determining whether the target skill name belongs to the output skill name corresponding to the at least one castable skill; and if the target skill name belongs to the output skill name corresponding to the at least one castable skill, casting a skill corresponding to the target skill name in the application. By implementing embodiments of the present invention, applications may be controlled easily.

6 Claims, 4 Drawing Sheets

(51) Int. Cl.
*A63F 13/215* (2014.01)
*A63F 13/537* (2014.01)
*G06F 3/0481* (2013.01)

(56) References Cited

U.S. PATENT DOCUMENTS

| | | | | |
|---|---|---|---|---|
| 2002/0099539 A1* | 7/2002 | Nishizawa | ............ | G10L 15/1807 704/207 |
| 2002/0111211 A1* | 8/2002 | Nishizawa | ............... | A63F 13/10 463/31 |
| 2003/0171147 A1* | 9/2003 | Sinclair | ................... | A63F 13/12 463/39 |
| 2004/0193441 A1* | 9/2004 | Altieri | .................... | G06Q 30/02 709/203 |
| 2006/0040720 A1* | 2/2006 | Harrison, Jr. | ............. | A63F 9/24 463/9 |
| 2011/0313768 A1* | 12/2011 | Klein | ..................... | G06F 3/017 704/251 |
| 2012/0089392 A1* | 4/2012 | Larco | .................... | G10L 15/063 704/231 |
| 2013/0179173 A1 | 7/2013 | Lee et al. | | |

FOREIGN PATENT DOCUMENTS

| | | |
|---|---|---|
| CN | 101648077 A | 2/2010 |
| CN | 102207845 A | 10/2011 |
| CN | 103208283 A | 7/2013 |
| EP | 2615607 A2 | 7/2013 |
| WO | 2007066894 A1 | 6/2007 |

OTHER PUBLICATIONS

International Search Report in international application No. PCT/CN2015/081789, dated Sep. 21, 2015.
Written Opinion of the International Search Authority in international application No. PCT/CN2015/081789, dated Sep. 21, 2015.
Notification of the First Office Action of Chinese application No. 201410273134.0, dated Jul. 6, 2018.

* cited by examiner

APPLICATION CONTROL METHOD AND TERMINAL DEVICE

CROSS REFERENCE TO RELATED APPLICATIONS

This is a continuation application of International Patent Application No. PCT/CN2015/081789, filed on Jun. 18, 2015, which claims priority to Chinese Patent Application No. 201410273134.0 filed on Jun. 18, 2014, the disclosures of which are incorporated by reference herein in their entirety.

FIELD OF THE TECHNOLOGY

The present disclosure relates to the field of Internet technologies, and in particular, to an application control method and a terminal device.

BACKGROUND OF THE DISCLOSURE

With the popularity of smart phones, a growing number of people start to control applications (such as turn-based games) on smart phones. Because scenarios of using smarts phones are characterized by diversification and fragmentation, it is getting more and more inconvenient to control applications on a smart phone with hands. For example, a user on a crowded subway or bus often needs to hold a smart phone in one hand and hold the handle in the hand; however, in this scenario, it is very difficult to control applications (for example, clicking a corresponding button on a screen to cast a corresponding skill) with hands.

SUMMARY

Embodiments of the present invention disclose an application control method and a terminal device by which an application can be controlled easily.

A first aspect of the embodiments of the present invention discloses an application control method, which comprises:

determining whether a currently running application meets a condition for casting a skill, and if the currently running application meets the condition for casting a skill, outputting a skill name corresponding to at least one castable skill;

detecting a target skill name input by a user in voice mode;

recognizing the target skill name and determining whether the target skill name belongs to the output a skill name corresponding to the at least one castable skill; and if the target skill name belongs to the output skill name corresponding to the at least one castable skill, casting a skill corresponding to the target skill name in the application.

A second aspect of the embodiments of the present invention discloses a terminal device, which comprises:

a determining unit, configured to determine whether a currently running application meets a condition for casting a skill;

a first outputting unit, configured to, after the determining unit determines that the currently running application meets the condition for casting a skill, output a skill name corresponding to at least one castable skill;

a detecting unit, configured to detect a target skill name input by a user in voice mode;

an recognizing unit, configured to recognize the target skill name and determine whether the target skill name belongs to the skill name corresponding to the at least one castable skill output by the first outputting unit; and a casting unit, configured to, after the recognizing unit determines that the target skill name belongs to the skill name corresponding to the at least one castable skill output by the first outputting unit, cast a skill corresponding to the target skill name in the application.

In the embodiments of the present invention, after it is determined that the currently running application meets the condition for casting a skill, a skill name corresponding to at least one castable skill may be output, so that a user may learn the skill name corresponding to the at least one castable skill, and then the target skill name input by the user in voice mode may be detected, and after it is determined that the target skill name belongs to the output skill name corresponding to the at least one castable skill, a skill corresponding to the target skill name may be cast in the application. It can be seen that, compared with application control with hands, in the embodiments of the present invention, an application can be controlled more easily in voice control mode; in addition, in the embodiments of the present invention, application control requirements in a non-stationary scenario (such as on a crowded subway or bus) may also be met, and a user does not need to recite skill names but read an output skill name when a skill may be cast, which greatly reduces learning cost of the user.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some of the embodiments of the present invention rather than all of the embodiments. All other embodiments obtained by a person of ordinary skill in the art based on the embodiments of the present invention without creative efforts shall fall within the protection scope of the present disclosure.

Embodiments of the present invention disclose an application control method and a terminal device by which an application may be controlled easily. The following describes in details the application control method and the terminal device separately.

Figure 1:
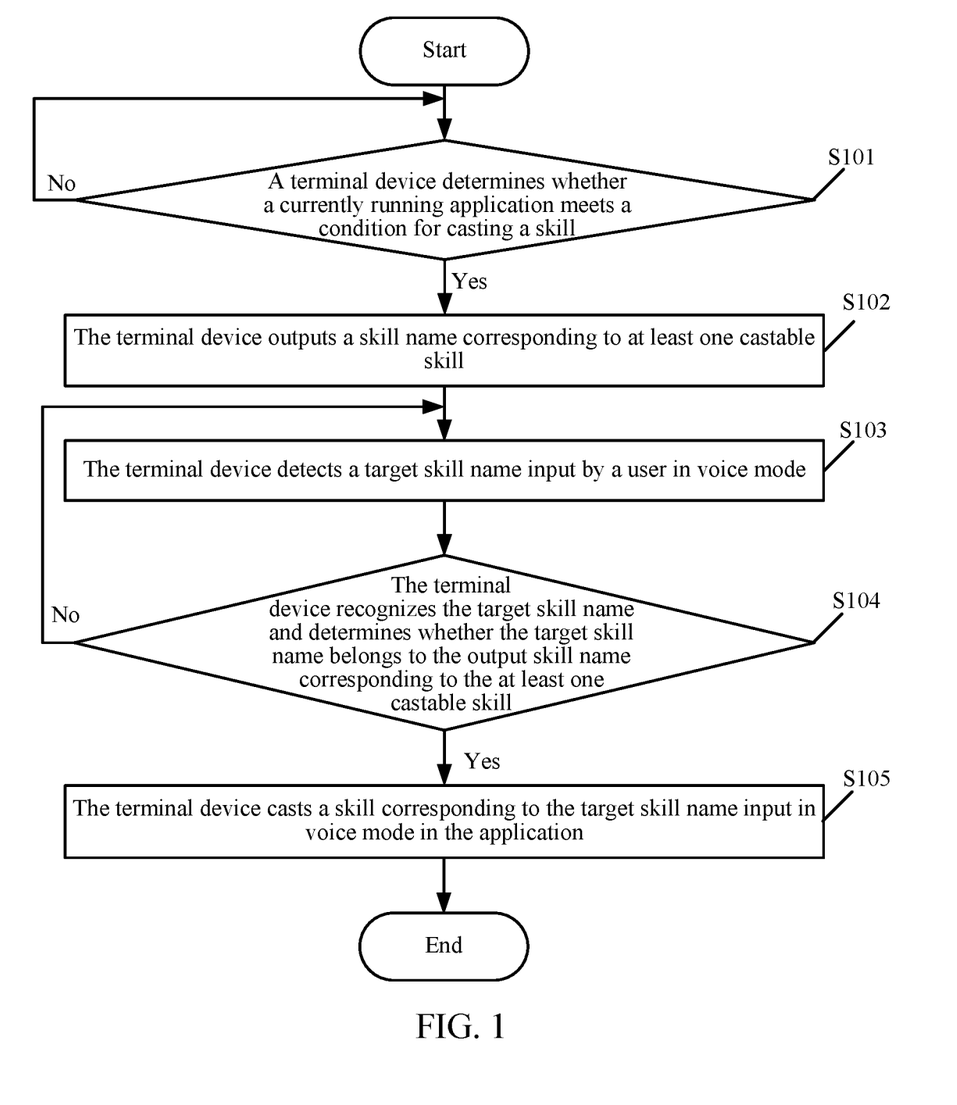
FIG. 1 is a flowchart of an application control method according to an embodiment of the present invention.

FIG. 1 is a flowchart of an application control method according to an embodiment of the present invention. The application control method in FIG. 1 is depicted in the perspective of a terminal device. As shown in FIG. 1, the method includes the following steps.

S101: A terminal device determines whether a currently running application meets a condition for casting a skill; if the currently running application meets the condition for casting a skill, perform step S102; and if the currently running application does not meet the condition for casting a skill, continue to perform step S101.

In the embodiment of the present invention, the terminal device may be a terminal device that can install and run applications such as a smart phone, a tablet, a palm computer, a mobile Internet device (MID), and the like. The embodiment of the present invention is not limited thereto.

In the embodiment of the present invention, the currently running application may not only include entertainment applications such as online music, online games, online literature, and the like, but also include education applications such as oral English, essential words, and other applications such as a navigation application, an instant messaging application, a social application, and the like. The embodiment of the present invention is not limited thereto.

In the embodiment of the present invention, in the foregoing step S101, the determining, by a terminal device, whether a currently running application meets a condition for casting a skill may include:

determining, by the terminal device, whether the currently running application meets any one or any combination of the following status situations, and if the currently running application meets any one or any combination of the following status situations, the condition for casting a skill is met;

where the status situations include: a running duration of the currently running application is longer than or equal to a set duration, a level of the currently running application is higher than or equal to a set level, and a fight intensity degree of a target in the currently running application is higher than or equal to a set intensity degree.

For example, if the currently running application is an education application, the terminal device may determine whether a level of the education application is higher than or equal to a set level, and if the level of the education application is higher than or equal to the set level, the terminal device may determine that the education application meets the condition for casting a skill.

For another example, if the currently running application is an education application, the terminal device may determine whether a running duration of the education application is longer than or equal to a set duration, and if the running duration of the education application is longer than or equal to the set duration, the terminal device may further determine whether a level of the education application is higher than or equal to a set level, and if the level of the education application is higher than or equal to the set level, the terminal device may determine that the education application meets the condition for casting a skill.

For another example, if the currently running application is a turn-based game, the terminal device may determine whether a fight intensity degree of a target (also referred to as a fighter) in the turn-based game is higher than or equal to a set intensity degree, and if the fight intensity degree of the target in the turn-based game is higher than or equal to the set intensity degree, the terminal device may determine that the turn-based game meets the condition for casting a skill. In the turn-based game, the fight intensity degree of the target (also referred to as a fighter) is usually represented by an energy expenditure (also referred to as blood loss volume), that is, if the fight energy expenditure of the target (also referred to as a fighter) in the turn-based game is higher than or equal to a set energy expenditure, the terminal may determine that the turn-based game meets the condition for casting a skill.

S102: The terminal device outputs a skill name corresponding to at least one castable skill.

In the embodiment of the present invention, when the currently running application meets the condition for casting a skill, the terminal device may output the skill name corresponding to the at least one castable skill in voice mode; and/or the terminal device may output the skill name corresponding to the at least one castable skill in display mode.

In the embodiment of the present invention, the skill name corresponding to the castable skill output by the terminal device is related to the currently running application. For example, if the currently running application is an education application, the terminal device may determine whether a level of the education application is higher than or equal to a set degree, and if the level of the education application is higher than or equal to the set degree, the terminal device may determine that the education application meets the condition for casting a skill, and in this case, the terminal device may output the skill name corresponding to the castable skill related to the education application. For example, the skill name corresponding to the castable skill related to the education application may include lighting effect skill names corresponding to castable lighting effect skills, such as one or combinations of a breath lighting effect, a flashing lighting effect, a gradient lighting effect, and a rotating lighting effect.

For another example, if the currently running application is a turn-based game, the terminal device may determine whether a fight intensity degree of a target (also referred to as a fighter) in the turn-based game is higher than or equal to a set intensity degree, and if the fight intensity degree of the target in the turn-based game is higher than or equal to the set intensity degree, the terminal device may determine that the turn-based game meets the condition for casting a skill. That is, if a fight energy expenditure of the target (also referred to as a fighter) in the turn-based game is higher than or equal to a set energy expenditure, the terminal may determine that the turn-based game meets the condition for casting a skill. In this case, the terminal device may output a skill name corresponding to a castable skill related to the turn-based game. For example, the skill name corresponding to the castable skill related to the turn-based game may include an anger skill name corresponding to a castable anger skill of the target, such as anger.

S103: The terminal device detects a target skill name input by a user in voice mode.

S104: The terminal device recognizes the target skill name and determines whether the target skill name input in voice mode belongs to the output skill name corresponding to the at least one castable skill; if the target skill name input in voice mode belongs to the output skill name corresponding to the at least one castable skill, perform step S105; and if the target skill name input in voice mode does not belong to the output skill name corresponding to the at least one castable skill, continue to perform step S103.

S105: The terminal device casts a skill corresponding to the target skill name in the application.

In the embodiment of the present invention, the skill corresponding to the skill name may include an animation effect of the target in the currently running application, a lighting effect of the currently running application, and the like. The embodiment of the present invention is not limited thereto.

For example, in step S103, when the terminal device finds that the target skill name input by the user in voice mode is "breath lighting effect", the terminal device may cast a breath lighting effect skill (that is, a lighting effect) corresponding to the target skill name "breath lighting effect" input in voice mode in the application.

For another example, in step S103, when the terminal device finds that the target skill name corresponding to the castable skill of the target input by the user in voice mode is "anger", the terminal device may cast an anger skill (that is, an animation effect) of the target in the application.

Compared with application control with hands, in the method depicted in FIG. 1, an application can be controlled more easily in voice control mode; in addition, in the method depicted in FIG. 1, application control requirements in a non-stationary scenario (such as on a crowded subway or bus) may also be met, and a user does not need to recite skill names but read an output skill name when a skill may be cast, which greatly reduces learning cost of the user.

Figure 2:
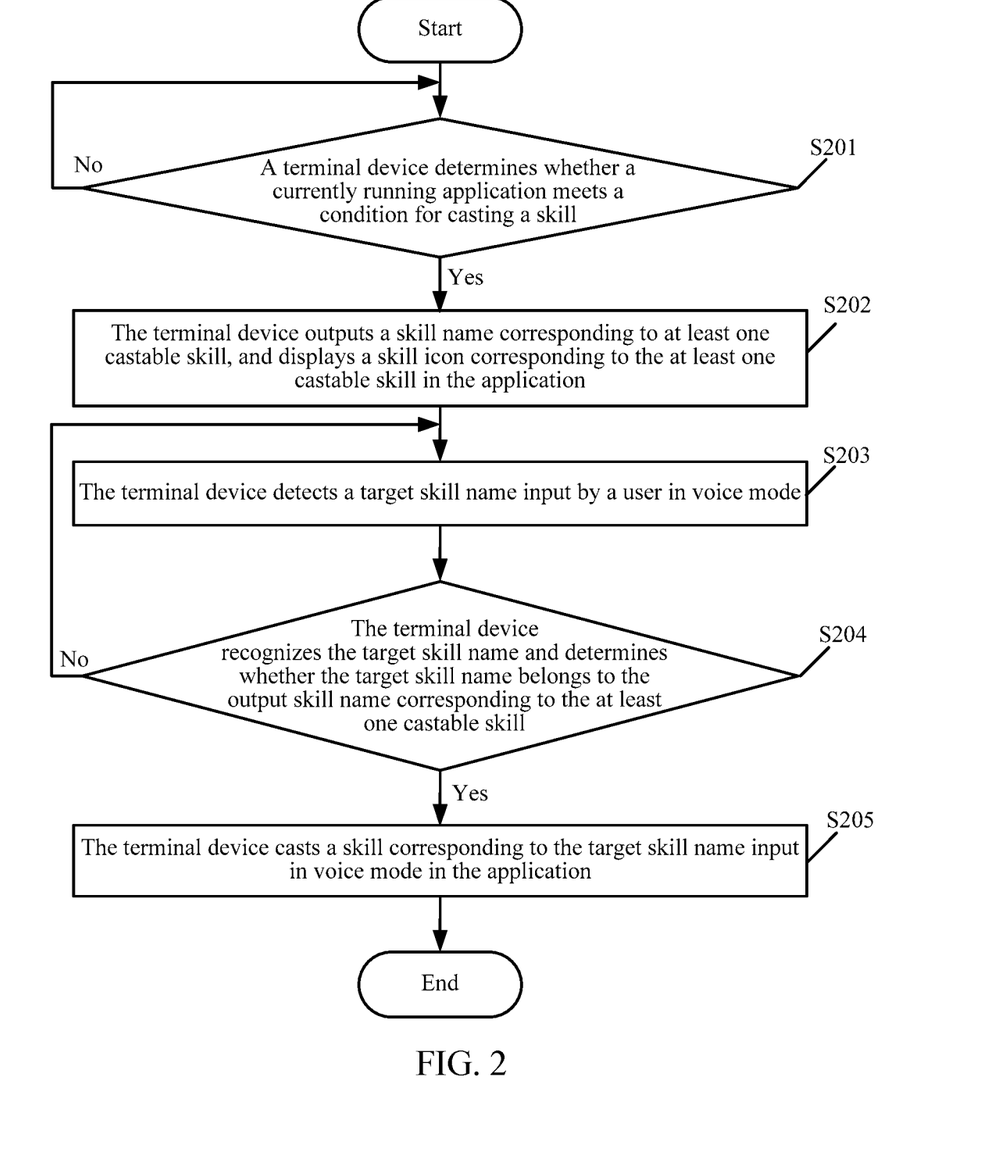
FIG. 2 is a flowchart of another application control method according to an embodiment of the present invention.

FIG. 2 is a flowchart of another application control method according to an embodiment of the present invention. The application control method in FIG. 2 is depicted in the perspective of a terminal device. As shown in FIG. 2, the method includes the following steps.

S201: A terminal device determines whether a currently running application meets a condition for casting a skill; if the currently running application meets the condition for casting a skill, perform step S202; and if the currently running application does not meet the condition for casting a skill, continue to perform step S201.

In the embodiment of the present invention, in the foregoing step S201, the determining, by a terminal device, whether a currently running application meets a condition for casting a skill may include:

determining, by the terminal device, whether the currently running application meets any one or any combination of the following status situations, and if the currently running application meets any one or any combination of the following status situations, the condition for casting a skill is met;

where the status situations include: a running duration of the currently running application is longer than or equal to a set duration, a level of the currently running application is higher than or equal to a set level, and a fight intensity degree of a target in the currently running application is higher than or equal to a set intensity degree.

For example, if the currently running application is an education application, the terminal device may determine whether a level of the education application is higher than or equal to a set level, and if the level of the education application is higher than or equal to the set level, the terminal device may determine that the education application meets the condition for casting a skill.

For another example, if the currently running application is an education application, the terminal device may determine whether a running duration of the education application is longer than or equal to a set duration, and if the running duration of the education application is longer than or equal to the set duration, the terminal device may further determine whether a level of the education application is higher than or equal to a set level, and if the level of the education application is higher than or equal to the set level, the terminal device may determine that the education application meets the condition for casting a skill.

For another example, if the currently running application is a turn-based game, the terminal device may determine whether a fight intensity degree of a target (also referred to as a fighter) in the turn-based game is higher than or equal to a set intensity degree, and if the fight intensity degree of the target in the turn-based game is higher than or equal to the set intensity degree, the terminal device may determine that the turn-based game meets the condition for casting a skill. In the turn-based game, the fight intensity degree of the target (also referred to as a fighter) is usually represented by an energy expenditure (also referred to as blood loss volume), that is, if the fight energy expenditure of the target (also referred to as a fighter) in the turn-based game is higher than or equal to a set energy expenditure, the terminal may determine that the turn-based game meets the condition for casting a skill.

S202: The terminal device outputs a skill name corresponding to at least one castable skill, and displays a skill icon corresponding to the at least one castable skill in the application.

In the embodiment of the present invention, when the currently running application meets the condition for casting a skill, the terminal device may output the skill name corresponding to the at least one castable skill in voice mode and display the skill icon corresponding to the at least one castable skill in the application; and/or the terminal device may output the skill name corresponding to the at least one castable skill in display mode and display the skill icon corresponding to the at least one castable skill in the application.

In the embodiment of the present invention, the skill name corresponding to the castable skill output by the terminal device is related to the currently running application. For example, if the currently running application is an education application, the terminal device may determine whether a level of the education application is higher than or equal to a set degree, and if the level of the education application is higher than or equal to the set degree, the terminal device may determine that the education application meets the condition for casting a skill, and in this case, the terminal device may output the skill name corresponding to the castable skill related to the education application. For example, the skill name corresponding to the castable skill related to the education application may include lighting effect skill names corresponding to castable lighting effect skills, such as one or combinations of a breath lighting effect, a flashing lighting effect, a gradient lighting effect, and a rotating lighting effect.

For another example, if the currently running application is a turn-based game, the terminal device may determine whether a fight intensity degree of a target (also referred to as a fighter) in the turn-based game is higher than or equal to a set intensity degree, and if the fight intensity degree of the target in the turn-based game is higher than or equal to the set intensity degree, the terminal device may determine that the turn-based game meets the condition for casting a skill. That is, if a fight energy expenditure of the target (also referred to as a fighter) in the turn-based game is higher than or equal to a set energy expenditure, the terminal may determine that the turn-based game meets the condition for casting a skill. In this case, the terminal device may output a skill name corresponding to the castable skill related to the turn-based game. For example, the skill name corresponding to the castable skill related to the turn-based game may include an anger skill name corresponding to a castable anger skill of the target, such as anger.

S203: The terminal device detects a target skill name input by a user in voice mode.

S204: The terminal device recognizes the target skill name and determines whether the target skill name input in voice mode belongs to the output skill name corresponding to the at least one castable skill; if the target skill name input in voice mode belongs to the output skill name corresponding to the at least one castable skill, perform step S205; and if the target skill name input in voice mode does not belong to the output skill name corresponding to the at least one castable skill, continue to perform step S203.

S205: The terminal device casts a skill corresponding to the target skill name input in voice mode in the application.

In the embodiment of the present invention, the skill corresponding to the skill name may include an animation effect of the target in the currently running application, a lighting effect of the currently running application, and the like. The embodiment of the present invention is not limited thereto.

For example, in step S203, when the terminal device finds that the target skill name input by the user in voice mode is "breath lighting effect", the terminal device may cast a breath lighting effect skill (that is, a lighting effect) corresponding to the target skill name "breath lighting effect" input in voice mode in the application.

For another example, in step S203, when the terminal device finds that the target skill name corresponding to the castable skill of the target input by the user in voice mode is "anger", the terminal device may cast an anger skill (that is, an animation effect) of the target in the application.

In the embodiment of the present invention, compared with application control with hands, in the method depicted in FIG. 2, an application can be controlled more easily in voice control mode; in addition, in the method depicted in FIG. 2, application control requirements in a non-stationary scenario (such as on a crowded subway or bus) may also be met, and a user does not need to recite skill names but read an output skill name when a skill may be cast, which greatly reduces learning cost of the user.

Figure 3:
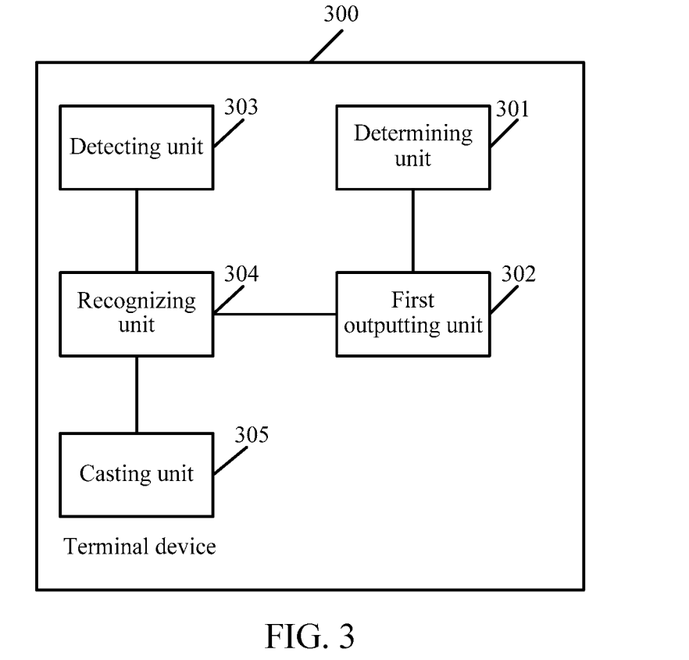
FIG. 3 is a schematic structural diagram of a terminal device according to an embodiment of the present invention.

FIG. 3 is a schematic structural diagram of a terminal device according to an embodiment of the present invention. As shown in FIG. 3, the terminal device may include:

a determining unit 301, configured to determine whether a currently running application meets a condition for casting a skill;

a first outputting unit 302, configured to, after the determining unit 301 determines that the currently running application meets the condition for casting a skill, output a skill name corresponding to at least one castable skill;

a detecting unit 303, configured to detect a target skill name input by a user in voice mode;

an recognizing unit 304, configured to, after the detecting unit 303 detects the target skill name input by the user in voice mode, recognize the target skill name and determine whether the target skill name belongs to the skill name corresponding to the at least one castable skill output by the first outputting unit 302; and a casting unit 305, configured to, after the recognizing unit 304 determines that the target skill name belongs to the skill name corresponding to the at least one castable skill output by the first outputting unit 302, cast a skill corresponding to the target skill name in the application.

In the embodiment of the present invention, after the recognizing unit 304 determines that the target skill name does not belong to the skill name corresponding to the at least one castable skill output by the first outputting unit 302, the casting unit 305 does not need to cast a skill corresponding to the target skill name in the application.

In the embodiment of the present invention, the determining unit 301 may be configured to determine whether the currently running application meets any one or any combination of the following status situations, and if the currently running application meets any one or any combination of the following status situations, the condition for casting a skill is met;

wherein status situations comprise: a running duration of the currently running application is longer than or equal to a set duration, a level of the currently running application is higher than or equal to a set level, and a fight intensity degree of a target in the currently running application is higher than or equal to a set intensity degree.

For example, if the currently running application is an education application, the determining unit 301 may determine whether a level of the education application is higher than or equal to a set level, and if the level of the education application is higher than or equal to the set level, the determining unit 301 may determine that the education application meets the condition for casting a skill.

For another example, if the currently running application is an education application, the determining unit 301 may determine whether a running duration of the education application is longer than or equal to a set duration, and if the running duration of the education application is longer than or equal to the set duration, the determining unit 301 may further determine whether a level of the education application is higher than or equal to a set level, and if the level of the education application is higher than or equal to the set level, the determining unit 301 may determine that the education application meets the condition for casting a skill.

For another example, if the currently running application is a turn-based game, the determining unit 301 may determine whether a fight intensity degree of a target (also referred to as a fighter) in the turn-based game is higher than or equal to a set intensity degree, and if the fight intensity degree of the target in the turn-based game is higher than or equal to the set intensity degree, the determining unit 301 may determine that the turn-based game meets the condition for casting a skill. In the turn-based game, the fight intensity degree of the target (also referred to as a fighter) is usually represented by an energy expenditure (also referred to as blood loss volume), that is, if a fight energy expenditure of the target (also referred to as fighter) in the turn-based game is higher than or equal to a set energy expenditure, the determining unit 301 may determine that the turn-based game meets the condition for casting a skill.

In the embodiment of the present invention, the first outputting unit 302 is configured to output skill names corresponding to castable skills in voice mode; and/or output the skill names corresponding to the castable skills in display mode.

Figure 4:
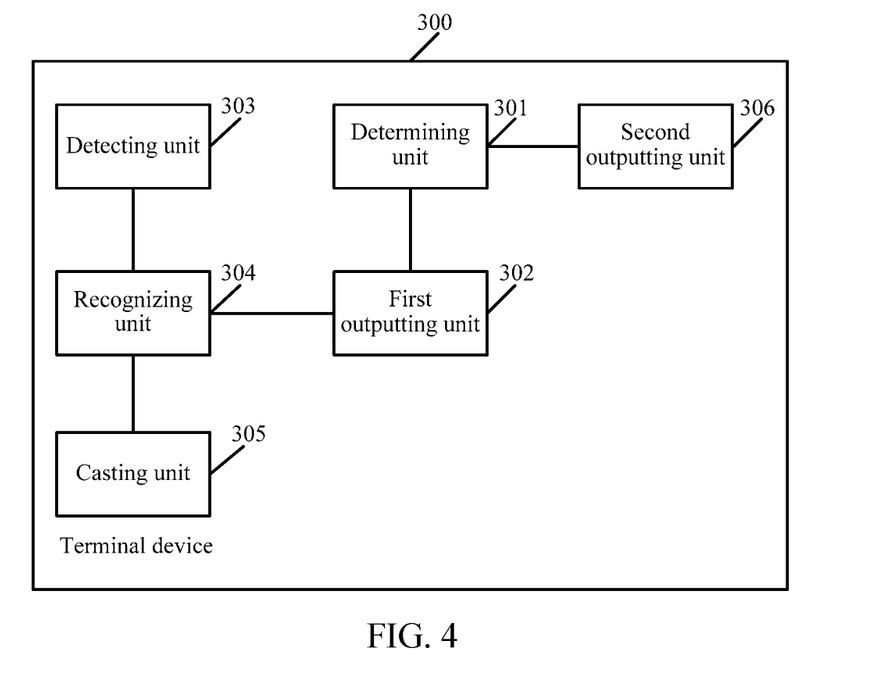
FIG. 4 is a schematic structural diagram of another terminal device according to an embodiment of the present invention.

FIG. 4 is a schematic structural diagram of another terminal device according to an embodiment of the present invention. The terminal device shown in FIG. 4 is obtained by optimizing the terminal device shown in FIG. 3. Compared with the terminal device shown in FIG. 3, the terminal device shown in FIG. 4 may further include:

a second outputting unit 306, configured to, after the determining unit 301 determines that the currently running application meets the condition for casting a skill, display a skill icon corresponding to the at least one castable skill, so as to improve a user's visual experience.

In the embodiment of the present invention, the skills corresponding to the skill names may include an animation effect of the target in the currently running application, a lighting effect of the currently running application, and the like. The embodiment of the present invention is not limited thereto.

For example, when the detecting unit 303 finds that the target skill name input by the user in voice mode is "breath lighting effect", the casting unit 305 may cast a breath lighting effect skill (that is, a lighting effect) corresponding to the target skill name "breath lighting effect" input in voice mode in the application.

For another example, when the detecting unit 303 finds that the target skill name corresponding to the castable skill of the target input by the user in voice mode is "anger", the casting unit 305 may cast an anger skill (that is, an animation effect) of the target in the application.

In the embodiments of the present invention, the terminal device depicted in FIG. 3 and FIG. 4 can control an application more easily; in addition, the terminal device depicted in FIG. 3 and FIG. 4 may also meet application control requirements in a non-stationary scenario (such as on a crowded subway or bus), and the terminal device depicted in FIG. 3 and FIG. 4 does not require a user to recite skill names but read an output skill name when a skill may be cast, which greatly reduces learning cost of the user.

Figure 5:
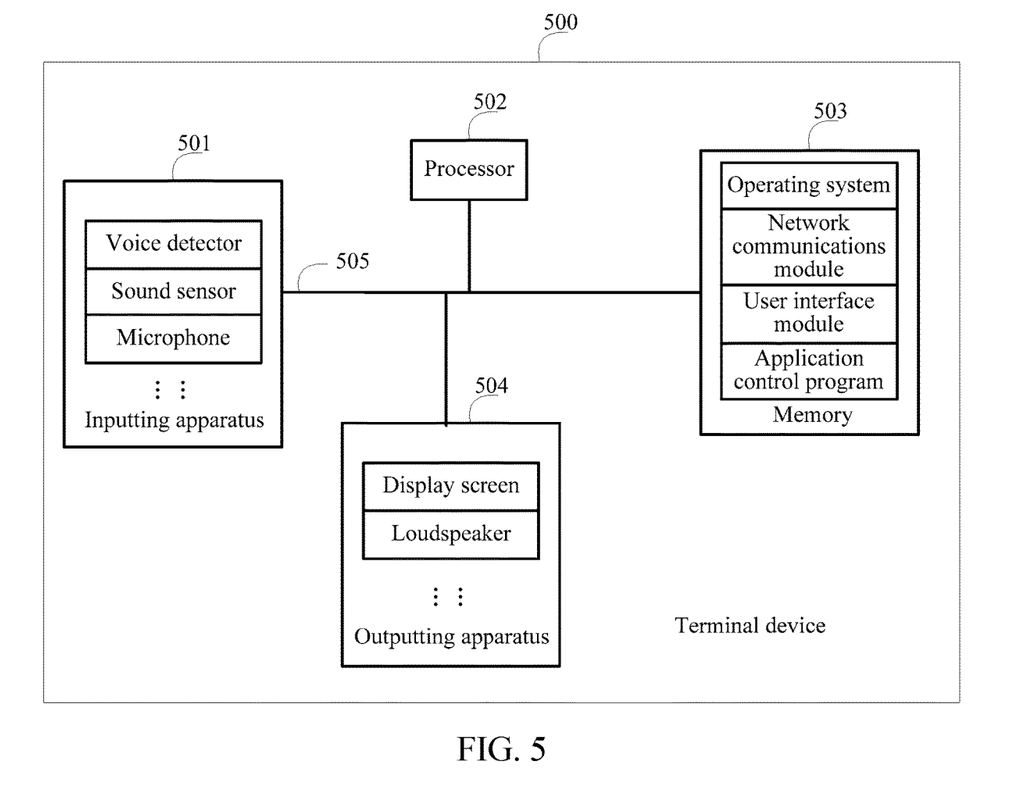
FIG. 5 is a schematic structural diagram of another terminal device according to an embodiment of the present invention.

FIG. 5 is a schematic structural diagram of another terminal device according to an embodiment of the present invention. As shown in FIG. 5, a terminal 500 may include an inputting apparatus 501, a processor 502, a memory 503, an outputting apparatus 504, and a communications bus 505. The communications bus 505 is configured to implement communications between these components. The inputting apparatus 501 may include a voice detector, a sound sensor, a microphone, and the like. The outputting apparatus 504 may include a display screen, a loudspeaker, and the like. As shown in FIG. 5, as a computer storage medium, the memory 503 may include an operating system, a network communications module, a user interface module, and an application control program.

In the terminal shown in FIG. 5, the processor 502 may be configured to invoke an application control program stored in the memory 503, and perform the following operations:

determine whether a currently running application meets a condition for casting a skill, and if the currently running application meets the condition for casting a skill, output, by the outputting apparatus 504, a skill name corresponding to at least one castable skill;

detect, by the inputting apparatus 501, a target skill name input by a user in voice mode;

recognize the target skill name and determine whether the target skill name input in voice mode belongs to the output skill name corresponding to the at least one castable skill; and if the target skill name belongs to the output skill name corresponding to the at least one castable skill, cast a skill corresponding to the target skill name in the application.

In the embodiment of the present invention, determining, by the processor 502, whether a currently running application meets a condition for casting a skill includes:

determining whether the currently running application meets any one or any combination of the following status situations, and if the currently running application meets any one or any combination of the following status situations, the condition for casting a skill is met;

wherein status situations comprise: a running duration of the currently running application is longer than or equal to a set duration, a level of the currently running application is higher than or equal to a set level, and a fight intensity degree of a target in the currently running application is higher than or equal to a set intensity degree.

In the embodiment of the present invention, outputting, by the processor 502, the skill names corresponding to the castable skills by using the outputting apparatus 504 includes:

outputting, by the processor 502, the skill names corresponding to the castable skills in voice mode by using the outputting apparatus 504;

and/or outputting, by the processor 502, the skill names corresponding to the castable skills in display mode by using the outputting apparatus 504.

In the embodiment of the present invention, after the processor 502 determines that the currently running application meets the condition for casting a skill, the processor 502 may also perform the following operations:

display a skill icon corresponding to the at least one castable skill in the application by using the outputting apparatus 504, so as to improve a user's visual experiment.

In the embodiment of the present invention, the foregoing skills include an animation effect of a target in the currently running application and a lighting effect of the currently running application.

In the embodiment of the present invention, the terminal device depicted in FIG. 5 can control an application more easily; in addition, the terminal device depicted in FIG. 5 may also meet application control requirements in a non-stationary scenario (such as on a crowded subway or bus), and the terminal device depicted in FIG. 5 does not require a user to recite skill names but read an output skill name when a skill may be cast, which greatly reduces learning cost of the user.

A person of ordinary skill in the art may understand that all or some of the methods in the embodiments may be implemented by a program instructing relevant hardware. The program may be stored in a computer-readable storage medium. The storage medium may include: a flash disk, a read-only memory (ROM), a random access memory (RAM), a magnetic disk, or an optical disc.

An application control method and a terminal device provided by the embodiments of the present invention are described above in detail. Specific examples are used in this specification to describe the principle and implementation manners of the present invention, but the foregoing descriptions of the embodiments are merely intended to facilitate understanding of the method and core idea of the present invention. Besides, a person of ordinary skill in the art may make alterations to the specific implementation manners and application scope according to the idea of the present invention. In conclusion, the content of this specification shall not be understood as a limitation on the present invention.

What is claimed is:

1. An application control method, comprising:
   determining, by a terminal device, a currently running application meets a condition for skill casting, wherein the condition includes a running duration of the currently running application is longer than or equal to a set duration, or a fight intensity degree of a target in the currently running application is higher than or equal to a set intensity degree;

in response to determining the currently running application meets the condition for skill casting, outputting by the terminal device and displaying on an interface of the terminal device, a skill icon and an output skill name corresponding to at least one castable skill in voice mode and/or in display mode, wherein the output skill name includes a first word of action on an animation effect or a lighting effect;

after the output skill name is outputted, detecting, by the terminal device, a target skill name input by a user in voice mode in response to the output skill name as outputted, wherein the target skill name includes a second word of action responsive to the first word of action in the output skill name;

recognizing the target skill name and determining, by the terminal device, the target skill name belongs to the output skill name corresponding to the at least one castable skill; and in response to determining the target skill name belongs to the output skill name corresponding to the at least one castable skill, casting, by the terminal device, a skill corresponding to the target skill name.

2. A terminal device, comprising: an inputting apparatus; a processor; a memory; and an outputting apparatus; wherein the processor is configured to invoke an application control program stored in the memory, and perform the following operations:

determine a currently running application meets a condition for skill casting, wherein the condition includes a running duration of the currently running application is longer than or equal to a set duration, or a fight intensity degree of a target in the currently running application is higher than or equal to a set intensity degree;

after the processor determines that the currently running application meets the condition for skill casting, output and display on a display interface, by the outputting apparatus, a skill icon and an output skill name corresponding to at least one castable skill in voice mode and/or in display mode, wherein the output skill name includes a first word of action on an animation effect or a lighting effect;

after the output skill name is outputted, detect, by the inputting apparatus, a target skill name input by a user in voice mode in response to the output skill name as outputted, wherein the target skill name includes a second word of action responsive to the first word of action in the output skill name;

recognize the target skill name and determine the target skill name belongs to the output skill name corresponding to the at least one castable skill; and in response to determining the target skill name belongs to the output skill name corresponding to the at least one castable skill, cast a skill corresponding to the target skill name.

3. A non-transitory storage medium comprising a plurality of computer executable instructions, the computer executable instructions being executed by one or more processors of a terminal device for controlling application, the computer executable instructions comprising:

determining a currently running application meets a condition for skill casting, wherein the condition includes a running duration of the currently running application is longer than or equal to a set duration, or a fight intensity degree of a target in the currently running application is higher than or equal to a set intensity degree;

in response to determining the currently running application meets the condition for skill casting, outputting and displaying on an interface of the terminal device, a skill icon and an output skill name corresponding to at least one castable skill in voice mode and/or in display mode, wherein the output skill name includes a first word of action on an animation effect or a lighting effect;

after the output skill name is outputted, detecting a target skill name input by a user in voice mode in response to the output skill name as outputted, wherein the target skill names includes a second word of action responsive to the first word of action in the output skill name;

recognizing the target skill name and determining the target skill name belongs to the output skill name corresponding to the at least one castable skill; and in response to determining the target skill name belongs to the output skill name corresponding to the at least one castable skill, casting a skill corresponding to the target skill name.

4. The application control method according to claim 1, wherein the first word of action is outputted in voice mode and includes a verb in a root form, a present participle form, a simple past form, or a past participle form.

5. The terminal device according to claim 2, wherein the first word of action is outputted in voice mode and includes a verb in a root form, a present participle form, a simple past form, or a past participle form.

6. The non-transitory storage medium according to claim 3, wherein the first word of action is outputted in voice mode and includes a verb in a root form, a present participle form, a simple past form, or a past participle form.

* * * * *